Jan. 30, 1962 J. W. CLINEFELTER 3,018,807
PERFORATED UNIT FOR PLASTIC EXTRUDING MACHINES
Filed May 2, 1958 2 Sheets-Sheet 1
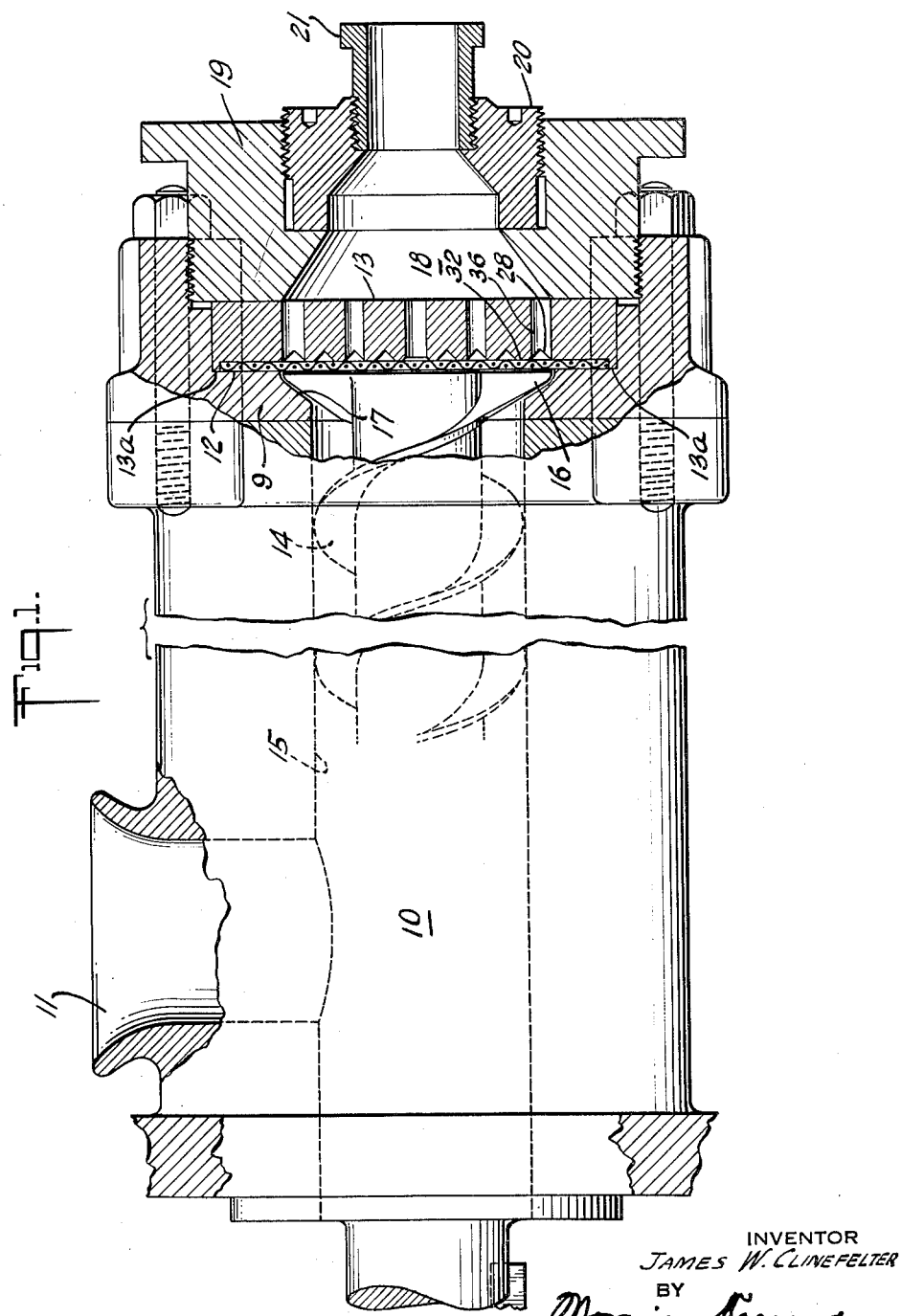
INVENTOR
JAMES W. CLINEFELTER
BY
ATTORNEYS

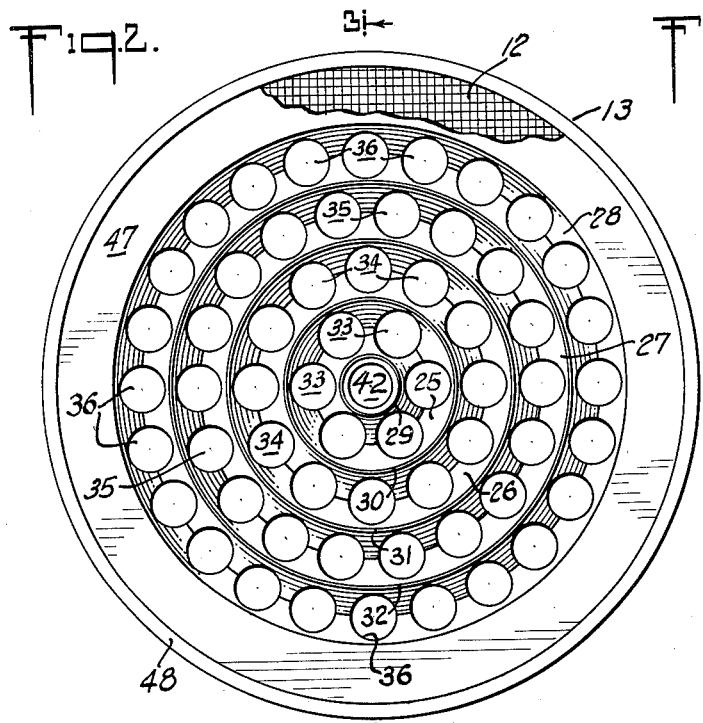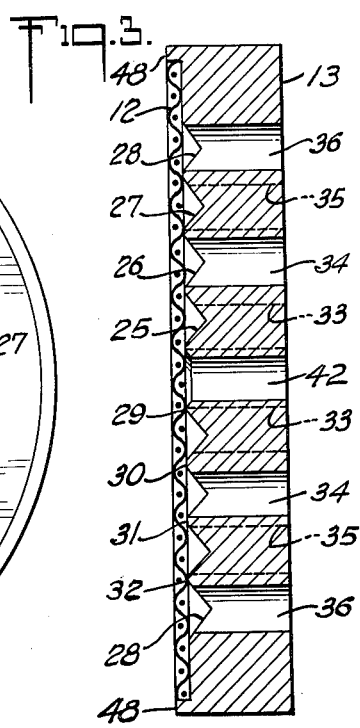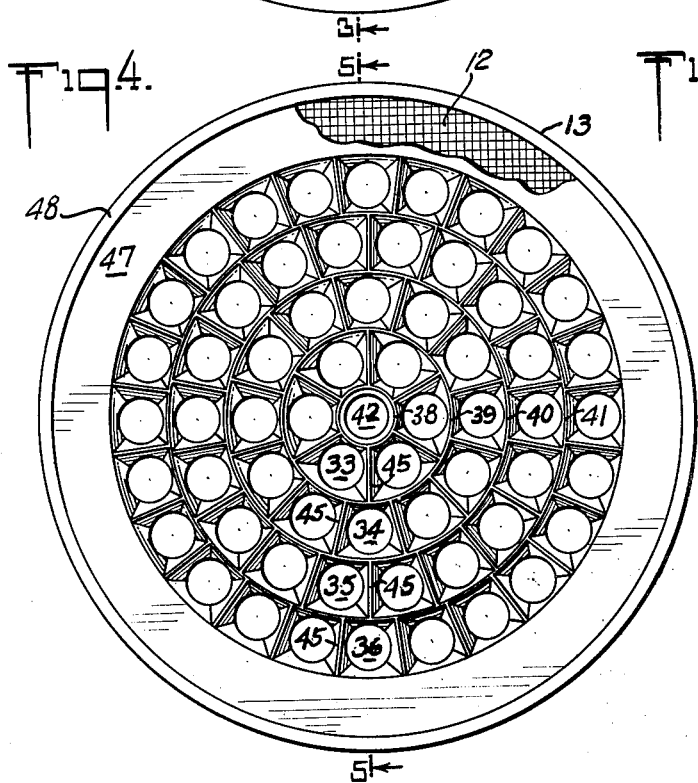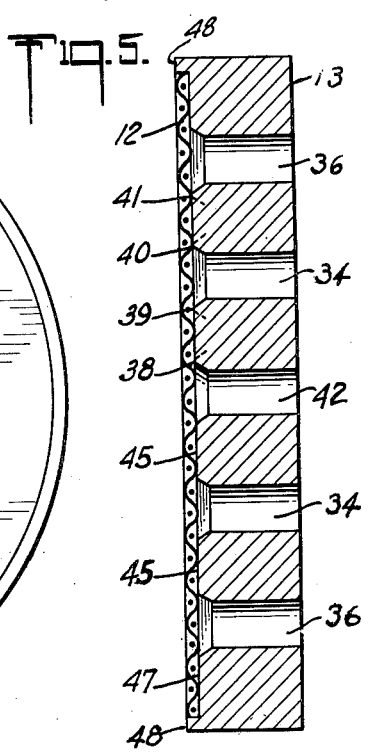

United States Patent Office 3,018,807
Patented Jan. 30, 1962

3,018,807
PERFORATED UNIT FOR PLASTIC EXTRUDING MACHINES
James W. Clinefelter, 618 Ridgecrest Road, Akron 3, Ohio
Filed May 2, 1958, Ser. No. 732,625
6 Claims. (Cl. 146—174)

The present invention relates to a perforated unit for use in screw feed plastic extruders normally used for mixing or straining plastic materials such as rubber, and although it has many uses, it is particularly adaptable for use in connection with machines for feeding, working, mixing and extruding plastic materials of the general character described in prior Patents No. 2,595,210 and 2,291,212 to J. C. Clinefelter.

In the aforesaid patents, there is described an extruding machine having a feed screw, an exit chamber and a perforated unit between said feed screw and said chamber. This perforated unit comprises an open mesh screen and a supporting plate designed to support said screen and making face contact therewith and formed with a multitude of through-holes distributed over the effective area of the screen.

The aforesaid patents also disclose a construction in which the chamber enclosing the screw and impeller flares outwardly towards the larger diameter of the perforated unit. Such construction permits a larger cross sectional area and also larger impeller blades, so that for any given screw speed, a larger volume of material can be forced through the perforated unit. This reduces the back pressure on the feed screw and results in far less turbulence and therefore less generated heat and greater machine capacity.

As the plastic material passes through the impeller, it is forced thereby through the perforated unit and then cut off by the rotating blades. This operation forms a multitude of comparatively small bits of the plastic material which emerges on the delivery side of the perforated unit into a conglomerate mass. The material is thereby physically plasticized and thoroughly mixed.

In addition it will be noted that the integral feed screw and impeller unit have the advantage of affording structural rigidity, better control and increased production due to the increased area for handling the material at the flared ends, provided it can be forced through the perforated unit in sufficient volume. The material is advanced by the feed screw into as many helical streams as there are full threads. When each of these streams reaches the field of action of the impeller, it is equally subdivided by each blade (in some instances by additional blades of the impeller) and advanced through the perforated unit. This blade action effects much better dispersion and higher speeds with multiple positive cutoffs.

In the past the problems with the perforated units have been as follows:

(1) Shrouding of considerable screen areas with consequent clogging, hardening and burning of material in this area, making it extremely difficult to disassemble and clean the screens.

(2) Due to the reduced useable screen area, the machines have been limited in output.

(3) Due to the reduced useable screen area, the speed of the plastic material through the existing openings has been much higher, thereby increasing mix temperatures and in some instances necessitating cooling the perforated unit in order to avoid spoilage of the material.

(4) The design of prior perforated units made it impossible to prevent leakage of the material around the outer edge.

The improved perforated unit herein disclosed was conceived with the idea of overcoming all of the above serious objections and it will soon become apparent that this has been accomplished. In the first place, the occurrence of shrouding the screen area with consequent loss of output and difficulty of cleaning has been entirely eliminated, and at the same time the problem of extreme temperature rises has also been solved. The other items of extreme importance are that the design disclosed herein not only supports but locks the screen in place and still provides sealing means for containing the plastic material in the chamber. In addition it accurately places the screen in the same position at all times and eliminates the necessity of adjustment on the feed screw due to screen distortion or bow.

Referring to the drawings:

FIG. 1 is a side elevation, partly in section, of a portion of an extruding machine equipped with a form of feed screw and impeller for extruding the plastic material through the improved circular perforated unit;

FIG. 2 is an entrance face view of one type of perforated unit particularly suitable for straining foreign matter and using a heavy coarse mesh screen;

FIG. 3 is a sectional view taken on the line 3—3 of FIG. 2;

FIG. 4 is a face view of another form of perforated unit particularly suitable for plasticizing and mixing rubber material and using a light fine mesh screen; and FIG. 5 is a sectional view taken on the line 5—5 of FIG. 4.

In FIG. 1 of the drawings there is shown a general type of extruding machine used for mixing plastics in which the improved perforated unit 12, 13 of the present invention is particularly useful. The material to be extruded is conveyed from hopper 11 by a rotating screw 14 with a flared impeller 16 into a conical chamber 18 formed in a threaded head member 19 and a second threaded die supporting member 20. The material is forced from the chamber 18 by suitable pressure through a die or discharge member 21 threaded into the die member 20. The screw 14 (only part of which is shown) is rotatably arranged in a cylindrical passageway 15 provided in the delivery end portion of the extruding machine 10. The screw 14 is of the usual conveyor type and is supported by the usual end bearings (drive end) and by the engagement of the outer edges of the threads or convolutions with the walls of the cylindrical passage 15 which completely support and take up all thrust delivered by the screw in its operation of pushing the material through the machine. In addition the screw 14 terminates in an outwardly flaring impeller 16 operating in a flared bore 17, formed in an adapter or head member 9 bolted to the exit end of the machine 10 and into which the head member 19 is threaded. The impeller 16 with its inclined surfaces receive the material from the feed screw 14 and, as the inclined surfaces rotate and sweep across the surface of the screen 12, the result is that the material is positively pushed through the perforated unit, eliminating to a large degree the back pressure which would be ordinarily exerted upon the conveyor screw. It will be noted that the perforated unit 12, 13 is clamped in place between the adapter 9 and threaded member 19. As the blades continuously impart a rotating movement to the mass in addition to the forward pushing movement, it will be seen that, after every severance at a given perforation, the material next pushed therethrough will be from a different portion of the batch. And as such action is continuous, occurring as it does at each perforation twice during each rotation of the impeller 16, thorough mixing of the batch will result.

In the embodiment shown in FIGS. 1 to 3, the improved perforated unit comprises a circular open mesh screen 12 and a circular supporting plate 13, which latter is formed with a series of circular concentric rows of axially extending holes 33, 34, 35 and 36 as well as a center hole 42, these holes being drilled all the way through the plate and distributed over the entire effective area of the screen. It will be noted that circular concentric V-shaped grooves 25, 26, 27 and 28 are turned in the entrance face of plate 13 and form a perfect entrance cone for accepting and guiding the plastic material into the circular concentric rows of holes 33, 34, 35 and 36 with a minimum amount of turbulence and friction, thereby reducing heating and increasing the capacity. Nevertheless, lands 29, 30, 31 and 32 are left between the V-shaped grooves and form perfect circular concentric support rings for the screen without blanking off any large area of said screen.

The screen 12 is fitted snugly in a circular recess 47 formed in the entrance face of the supporting plate 13, the depth of the recess being slightly less than the thickness of the screen so as to permit the screen to be locked against rotation when the perforated unit is clamped in place between the adapter 9 and the threaded head member 19. The area of the recess 47, beyond the outermost row of holes 36, serves as a screen clamping surface. The ring 48, which defines the outer peripheral wall of the recess, makes face contact with the surface 13a of the adapter 19, and this metal-to-metal contact between the adapter 9 and the perforated unit (when the latter is clamped in place by tightening up the threaded head member 19) creates a perfect annular seal which prevents leakage of the plastic material from the impeller bore 17 around the perforated unit. This is a most desirable feature, bearing in mind the high pressures which are developed in rubber extruding machines.

It may be mentioned that, in order to handle the screen 12 and supporting plate 13 as a unit, the latter is provided at different points around its screen clamping surface with magnetized cores which hold the screen in place as it is inserted into and removed from the machine.

In FIG. 4 and FIG. 5 another embodiment of the invention is disclosed wherein a lighter and finer screen is used, involving a greater support problem. In this instance, the entrances to the holes 33, 34, 35, 36 and 42 in the supporting plate 13 are relieved in the form of four-sided truncated pyramids, thereby providing continuous concentric circular support lands 38, 39, 40 and 41 between the circular rows of holes as well as radial support ribs 45 between the adjacent holes in each circular row. The radial ribs 45 are of course flush with the circular lands 38 to 41. The same results are apparent here as in FIG. 2 and FIG. 3. In addition it might be stated that very light screens may be used with this design without distortion or collapse and with greater ease of cleaning.

While the improved perforated unit is herein shown as applied to an extruder equipped with a die chamber for mixing and shaping as well as with an impeller to insure perfect mixing of the material, it should be understood that it is equally applicable to an extruder used as a "strainer" with or without an impeller, or in fact to any type of extruder in which a perforated unit would be useful.

In the accompanying drawings, the invention has been shown merely by way of example and in preferred form, but obviously many variations and modifications may be made therein which will still be comprised within its spirit. It is to be understood therefore that the invention is not limited to any specific form or embodiment, except insofar as any limitations are specified in the appended claims.

What is claimed is:

1. In or for a plastic extruding machine of the rotary screw conveyor type, a perforated unit through which the plastic material is pressed under the propelling force of the rotary screw conveyor and comprising an open mesh screen and a supporting plate making face contact therewith and formed with a multiplicity of through-holes distributed over the effective area of the screen, said holes being arranged in a series of concentric circular rows and said supporting plate being formed on its screen contacting face with a series of V-shaped grooves arranged in concentric circles to match the rows of holes and thereby relieve the holes at their entrance ends, the holes extending through the sloping side walls of the V-shaped grooves and starting adjacent the screen contacting face of the supporting plate.

2. A perforated unit according to claim 1, wherein the concentric circular V-shaped grooves are closely spaced so that the intervening V-shaped walls which separate adjacent grooves provide narrow lands which afford ample support for the screen.

3. In or for a plastic extruding machine of the rotary screw conveyor type, a perforated unit through which the plastic material is pressed under the propelling force of the rotary screw conveyor and comprising an open mesh screen and a supporting plate making face contact therewith and formed with a multiplicity of through-holes distributed over the effective area of the screen, said holes being circular in cross section and of uniform size arranged in a series of concentric circles, leaving a series of annular lands which separate adjacent rows of holes, as well as with a series of radial ribs flush with the circular lands and which separate adjacent holes in each circular row, the side walls of the lands and the side walls of the radial ribs, for each individual hole, converging inwardly toward the center line of the hole and said hole extending through said side walls and starting adjacent the screen contacting face of the supporting plate.

4. In or for a plastic extruding machine of the rotary screw conveyor type, a perforated unit through which the plastic material is pressed and under the propelling force of the rotary screw conveyor and comprising an open mesh screen and a supporting plate making face contact therewith and formed with a multiplicity of through-holes distributed over the effective area of the screen, said holes being arranged in a series of concentric circular rows and said supporting plate being formed on its screen contacting face with a series of grooves arranged in concentric circles to match the rows of holes, said grooves sloping or inclined walls converging toward each other in the direction of material flow and said holes extending through the sloping walls of the grooves and starting adjacent the screen contacting face of the supporting plate.

5. In a machine for extruding rubber or rubber-like material, the combination of a feed chamber, a die chamber in communication therewith, a perforated unit arranged between the feed chamber and the die chamber, and a rotary screw for advancing the material along the feed chamber and forcing it through the perforated unit into and through the die chamber, said perforated unit comprising an open mesh screen and a supporting plate making face contact therewith and formed with a multiplicity of through-holes distributed over the effective area of the screen, said holes being arranged in a series of concentric circular rows and said supporting plate being formed on its screen contacting face with a series of V-shaped grooves arranged in concentric circles to match the rows of holes and thereby relieve the holes at their entrance ends, the holes extending through the sloping side walls of the V-shaped grooves and starting adjacent the screen contacting face of the supporting plate.

6. A combination according to claim 5, wherein the feed screw is provided at the end of the feed chamber with an impeller which sweeps across the face of the screen to aid in forcing the material therethrough as well as to sever the material which enters the perforated unit from the material being advanced in the feed chamber.

References Cited in the file of this patent

UNITED STATES PATENTS

| | | |
|---|---|---|
| 1,931,872 | Lodge | Oct. 24, 1933 |
| 2,591,508 | Brown | Apr. 1, 1952 |
| 2,593,136 | Gliss | Apr. 15, 1952 |
| 2,640,033 | Marshall | May 26, 1953 |

FOREIGN PATENTS

| | | |
|---|---|---|
| 636,976 | Germany | Oct. 16, 1936 |
| 629,497 | Great Britain | Sept. 21, 1949 |
| 536,803 | Canada | Feb. 5, 1957 |
| 546,253 | Canada | Sept. 17, 1957 |